(12) United States Patent
Proctor et al.

(10) Patent No.: US 6,285,682 B1
(45) Date of Patent: Sep. 4, 2001

(54) METHOD AND APPARATUS FOR DETERMINING THE FRAME RATE OF A FRAME

(75) Inventors: Lee M. Proctor, Cary; Mark D. Hetherington, Crystal Lake; Nai Sum Wong; William K. Morgan, both of Palatine, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/563,767

(22) Filed: May 1, 2000

(51) Int. Cl.[7] .............................. H04L 12/56; H04T 3/22
(52) U.S. Cl. ...................... 370/465; 370/470; 370/474
(58) Field of Search .................... 370/252, 253, 370/230, 232, 235, 465, 468, 470, 471, 474

(56) References Cited

U.S. PATENT DOCUMENTS

| 5,414,796 | * | 5/1995 | Jacobs et al. | 701/201 |
| 5,442,625 | * | 8/1995 | Gitlin et al. | 370/468 |
| 5,673,266 | * | 9/1997 | Li | 370/465 |
| 5,856,975 | * | 1/1999 | Rostoker et al. | 370/474 |

* cited by examiner

Primary Examiner—Hassan Kizou
Assistant Examiner—Afsar M. Qureshi
(74) Attorney, Agent, or Firm—Kenneth A. Haas

(57) ABSTRACT

Because prior-art rate determination algorithms are prone to falsing, a sub-rate discrimination metric generator (160) is provided herein. The generator (160) correlates a received frame with known characteristics of sub-rate frames to generate additional metrics useful in rate determination. These metrics are passed to a modified rate determination algorithm (150).

16 Claims, 6 Drawing Sheets

METHOD AND APPARATUS FOR DETERMINING THE FRAME RATE OF A FRAME

FIELD OF THE INVENTION

The present invention relates generally to communication systems, and more particularly, the present invention relates to a method and apparatus for determining the frame rate of a frame in a communication system.

BACKGROUND OF THE INVENTION

Within a Code Division Multiple Access (CDMA), and other communication system types, communicated information, either voice or data, is carried between communication resources, e.g., a radio telephone and a base station, on a communication channel. Within broadband, spread spectrum communication systems, such as CDMA based communication systems in accordance with Interim Standard IS-95B, a spreading code is used to define the communication channel.

CDMA systems have the capability of transmitting user information at variable rates. For example in voice calls the data rate of each speech frame is varied based on the speech activity. When a user is speaking, compressed speech information is typically sent at full rate. Between words and sentences the data rate is typically reduced to eighth rate. Half and quarter rates are also used for speech to quiet transitions and when data rate reductions are required, such as to allow for multiplexing of signaling information or to increase system capacity. In data services calls, full, half, quarter and eighth rate frames can be selected based on the data rate of the user requested information.

To protect against data corruption on the air interface, mobile communication systems typically employ Forward Error Correction techniques. In the base site to mobile subscriber unit direction, deemed the forward link, IS-95 includes the addition of Cyclic Redundancy Check (CRC) bits, convolutional encoding, data repetition and interleaving. Data repetition is used on sub-rate frames (half, quarter and eighth rate) after convolutional encoding resulting in a constant data rate on the air interface.

In CDMA communication systems the receiver does not know apriori the data rate of a received frame. The receiver has to apply the decoding mechanism for each of the allowable frame rates, and look at certain characteristics of the received data frames to determine the probable frame rate that the frame was transmitted at. Characteristics that are usually employed are Symbol Error Rate (SER), CRC verification and Viterbi decoder Quality bits. SER is an estimate of the number of symbol errors in the convolutionally coded data that is obtained by re-encoding the information sequence recovered by convolutional decoding and accumulating the number of re-encoded channel symbols found to be different from the received symbols. Some of the frame rates, namely full and half rate for IS-95, are protected by a CRC codeword. These are generated by the transmitter by performing a type of degenerate cyclic coding on the data. The resulting CRC is convolutionally encoded and transmitted with the data. The receiver also generates the CRC of the received convolutionally decoded data, and compares it with the CRC appended by the transmitter. Viterbi decoders are typically used for convolutional decoding. In addition to the data sequence they sometimes provide a Quality bit indication that indicate whether a decoded sequence deviated excessively from a valid data sequence.

The decision as to what rate was employed by the transmitter is typically performed by the receiver's Rate Determination Algorithm (RDA). The RDA uses the decoding characteristics from each of the decoders to determine what rate the received frame was transmitted at and/or whether the frame is useable. If the frame contains too many bit errors or its rate cannot be determined the frame is declared an erasure. A RDA will typically have a series of rules that it follows to determine the rate. For example some such rules could be IF $CRC_{full}$==TRUE AND $SER_{full}$<=$SER_{fullthreshold}$
  THEN FRAME_RATE=FULL
IF $CRC_{full}$==FALSE AND $SER_{full}$>$SER_{fullthreshold}$
  AND $CRC_{half}$==FALSE AND $SER_{half}$>$SER_{halfthreshold}$
  AND $SER_{eighth}$<$SER_{eighththreshold}$
  THEN FRAME_RATE=EIGHTH Although RDAs typically do a good job of distinguishing between frame rates they are still subject to falsing. For example, a frame that was transmitted as an eighth rate frame can be incorrectly interpreted by the receiver as a full rate frame. The effects of these mis-determined rates can be severe, sometimes resulting in severe audio artifacts in voice calls and a reduction in data throughput for data calls. The falsing rate has been found to be dependant on many variable factors including the content of the frame being transmitted, interference conditions on the air interface and the performance of the receivers RDA. The FEC protocols used in IS-95 and known in the art have also been found to be non-optimal in providing adequate code distance between a transmitted sub-rate frame and the nearest possible full rate frame. For example, when presented with silence, the Enhanced Variable Rate Codec (EVRC) used in CDMA systems has been observed to converge on the 16 bit eighth rate frame 0740H, and repeat this frame over and over, Simulations of the IS-95 FEC scheme shows that this eighth rate when passed through the eighth rate convolutional encoder and data repeater, could be decoded by a full rate decoder with a very low SER. When the encoded frame is punctured by power control bits and suffers a few bit errors on the air interface it has been observed that the CRC can also pass. As shown by the RDA rules above, these conditions of a CRC pass and low SER are typically sufficient for the received frame to be declared a good full rate frame.

The severity of the resulting audio effects depend primarily on the contents of the received false full rate frame and whether they correspond to high audio gains, high frequencies etc after speech decoding. However, error mitigation techniques that are used to reduce the audio effects of air interface erasures have been found to also negatively affect the audio artifact.

Thus, there is a need for a method and apparatus for providing an improved rate determination scheme in a communication system.

DETAILED DESCRIPTION OF THE PREFERRED EMBODIMENTS

Because prior-art rate determination algorithms are prone to falsing, a sub-rate discrimination metric generator that reduces falsing is provided herein. The generator correlates a received frame with known characteristics of sub-rate frames to generate additional metrics useful in rate determination. These metrics are passed to a modified rate determination algorithm.

The present invention encompasses a method for determining a frame rate from a set of possible frame rates for a frame received in a communication system. The method comprises the steps of receiving the frame, segmenting the frame into a set of segments, and determining a confidence level that symbols within a segment of the set of segments were originally transmitted with the same polarity. The confidence level is compared with a threshold and the frame rate is determined for the frame based on the comparison.

The present invention additionally encompasses a method for determining a frame rate from a set of possible frame rates for a frame in a communication system. The method comprises the steps of receiving a frame, segmenting the frame into a first set of segments, each segment containing 8 symbols, segmenting the frame into a second set of segments, each segment containing 2 symbols, determining a first confidence level that the frame was originally transmitted as an eighth rate frame, and determining a second confidence level that the frame was originally transmitted as a half rate frame.

Finally, the present invention encompasses an apparatus for determining a frame rate of a frame within a communication system. The apparatus comprises a rate determiner having an input comprising a sub-rate correlation result, the sub-rate correlation result determined based on segmenting the frame into a set of segments and determining a confidence level that symbols within a segment of the set of segments were originally transmitted with the same polarity, the rate determiner outputting a frame rate based on the sub-rate correlation result.

Figure 1:
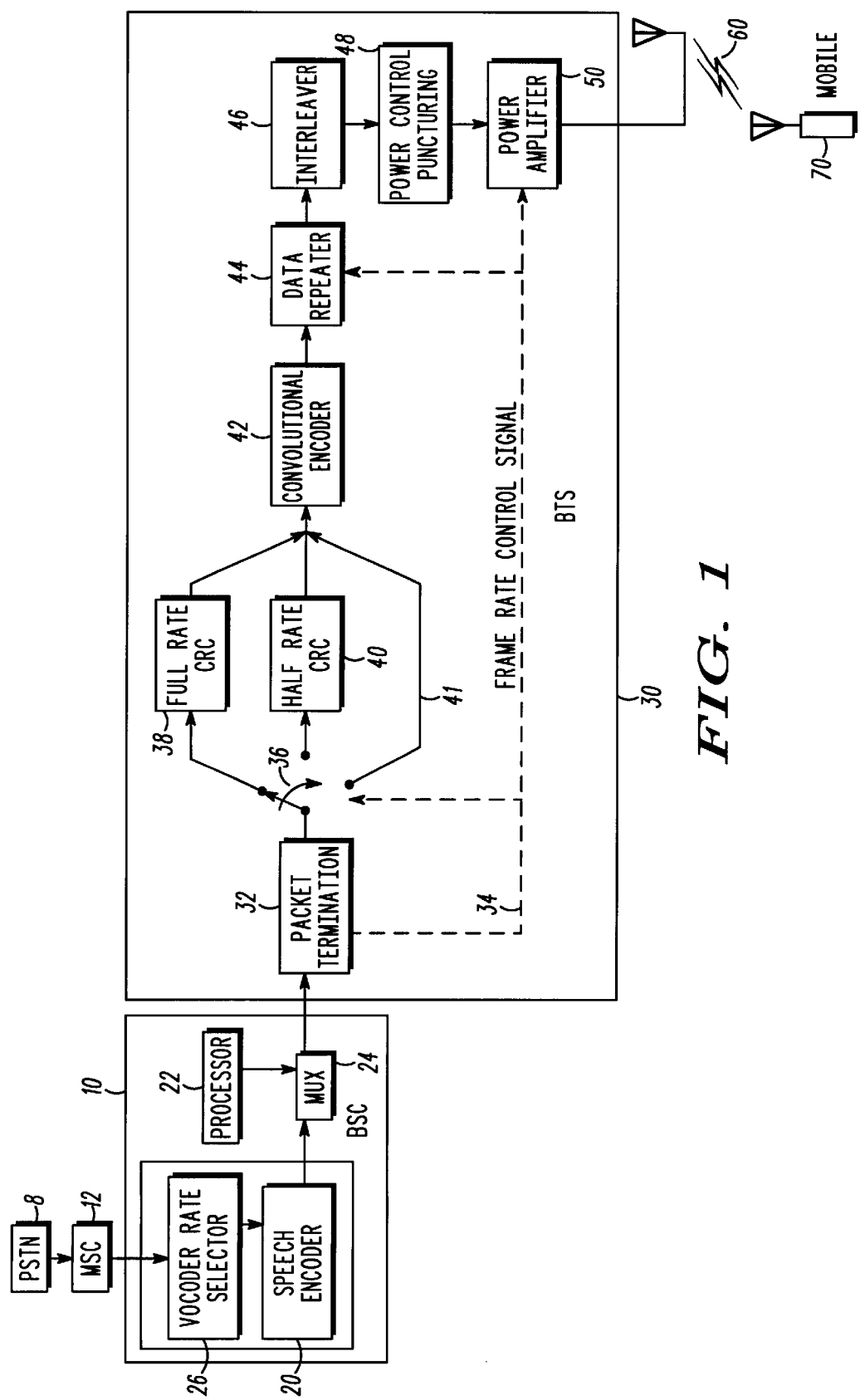
FIG. 1 is a block diagram of a wireless communication system.

FIG. 1 generally depicts a communication system in accordance with the preferred embodiment of the present invention. As shown in FIG. 1, a Base Site Controller (BSC) 10 is in communication with a Mobile Switching Center (MSC) 12 which is in turn in communication with the PSTN 8. In the preferred embodiment, the communication system is a Code Division Multiple Access (CDMA) cellular radio-telephone system, however it will be recognized by those of ordinary skill in the art that any suitable communication system may utilize the invention.

BSC 10 includes a speech encoder 20, a processor 22 and a multiplexer (MUX) 24. The speech encoder 20 receives speech samples at a data rate of 64 kbits/sec from the MSC 12 and uses speech compression algorithms such as Enhanced Variable Rate Codec (EVRC), that are well known in the art, to reduce the data rate. Speech Encoder 20 includes a rate selector 26, that selects the appropriate data rate for each 20 mS portion of the received speech to be encoded at. The data rate of the resulting compressed speech frame is typically dependant on the level of speech activity within the sampled speech. In the case of EVRC there are three valid frame rates; full, half and eighth rate. Typically full rate frames are produced when active speech is occurring and eighth rate frames are produced during quiet periods. Half rate frames are typically produced during speech to quiet transitions or if commanded to by the MUX 24. For EVRC a full rate speech frame followed by an eighth rate speech frame is not allowed, hence all speech to quiet transitions include a half rate speech frame.

Processor 22 is responsible for generating and terminating signaling messages with the mobile unit 70. These signaling messages are multiplexed with the encoded speech frames from speech encoder 20 and with some additional control information by the MUX 24 to form full, half or eighth rate traffic frames. The additional control information includes a parameter specifying the traffic frame rate. The traffic frames are then sent via communication link 28 to the Base Transmitter Site (BTS) 30.

The traffic frames are received by the packet terminator 32, which generates a control signal 34 indicative of the traffic frame rate. A switch 36 controlled by the control signal 34 determines whether a full rate CRC 38, a half rate CRC 40 or no CRC 41 is appended to the traffic frame. The traffic frames are then passed through a ½ rate convolutional encoder 42 before being presented to the data repeater 44. The data repeater takes sub-rate frames, such as half and eighth rate frames, and upsamples them so that all frames contain the same number of bits. In the case of eighth rate frames every received bit is repeated seven times. Similarly every bit is repeated once for half rate frames. After the data repeater 42 every frame contains 384 bits.

The frames are then passed through a data interleaver 46 which scrambles the data in a predetermined order. This improves the resilience of the frame to burst errors on the air interface 60. 32 bits, in predetermined positions, within the frame are then replaced by power control information bits. This process is performed by the power control puncturing function 48. The resulting frame is passed to the power amplifier 50 for transmission over the air interface 60. The transmission power used for the frame is partly dependent on the control signal 34. The frame is then received, probably with bit errors, by the mobile unit 70.

Figure 2:
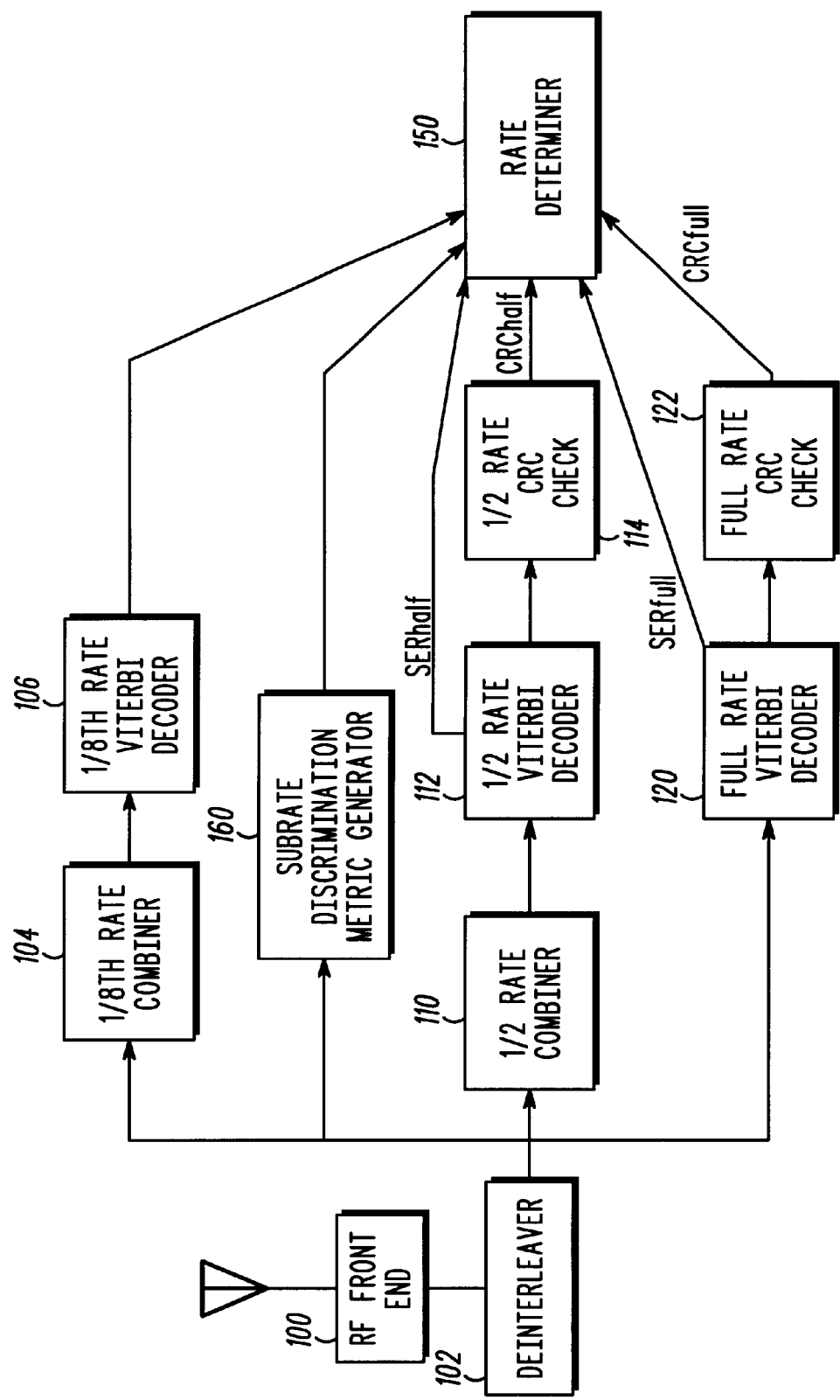
FIG. 2 is a block diagram of the error correction functions within a wireless unit in accordance with the preferred embodiment of the present invention.

FIG. 2 depicts the error correction functions within the mobile unit 70 of FIG. 1. The deinterleaver 102 receives 384 symbols from the RF front end 100. Each symbol is a confidence level of whether the corresponding transmitted bit was a 0 or a 1. These confidence levels are deemed soft decision values. For example in a 4 bit soft decision system a 0000 could represent very high probability that a transmitted bit was a 0 and 1111 could represent a very high probability that the bit was a 1. 1001 would suggest that the transmitted bit was a 1, but the confidence of the RF front end 100 is low. The deinterleaver 102 descrambles the symbols and presents the frame to multiple decode paths. A decode path exists for each possible traffic frame rate that the received frame could have been originally sent at by the MUX 24 of FIG. 1. The multiple decode paths are necessary because the receiver does not know apriori the traffic frame rate. In the case of EVRC there are three possible frame rates, full, half and eighth rate.

The eighth rate decode path consists of an $1/8^{th}$ rate combiner 104 and a convolutional decoder 106. The eighth rate combiner 104 combines each group of 8 consecutive symbols into one symbol to compensate for the data repetition introduced by the data repeater 44 of FIG. 1. The convolutional decoder 106, which is used to correct errors in the frame, outputs 16 data bits and an estimate of the Symbol Error Rate $SER_{eighth}$. The half rate decode path consists of a half rate combiner 110, a convolutional decoder 112 and a CRC check 114. The convolutional decoder 112 outputs 80 data bits, $SER_{half}$ and the received CRC. The CRC is checked by the CRC check 114 and the result $CRC_{half}$ is passed to the rate determiner 150 that utilizes a rate determination algorithm (RDA). The full rate decode path consists of a convolutional decoder 120 and a CRC check 122. The convolutional decoder 120 outputs 172 data bits, $SER_{full}$ and the received CRC. The CRC is checked by the CRC check 122 and the result $CRC_{full}$ is passed to the determiner 150.

The SER and CRC parameters as well as their use in determining the rate of a frame are well known in the art. However, as previously mentioned, the determiner 150 is prone to falsing and can sometimes mis-determine the rate of a frame. In accordance with the preferred embodiment of the invention, a sub-rate discrimination metric generator 160 is introduced. The generator 160 correlates the received frame with known characteristics of sub-rate frames to generate additional metrics useful in rate determination. These metrics are passed to a modified determiner 150.

Figure 3:
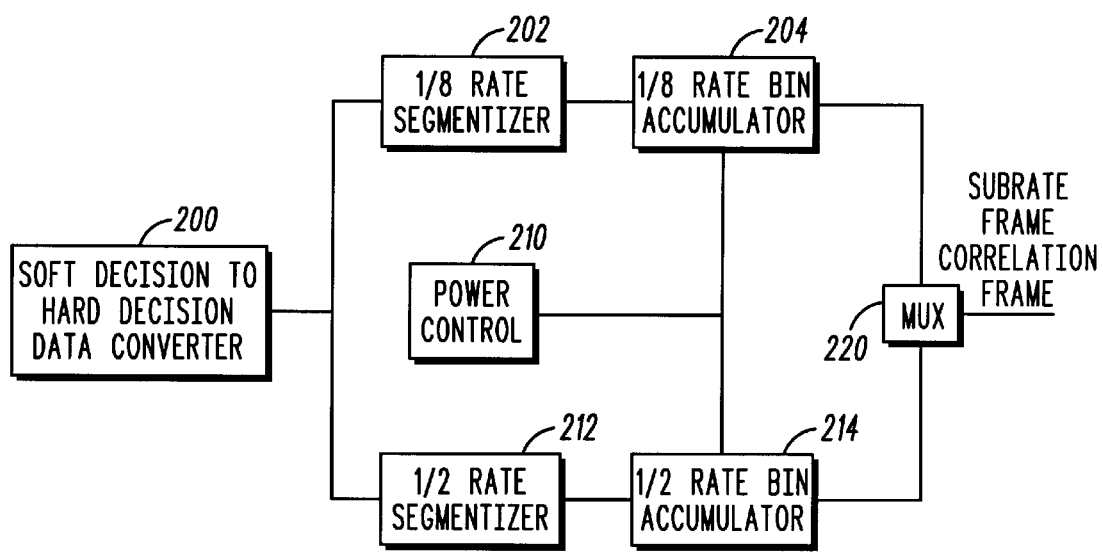
FIG. 3 is a block diagram of a sub-rate discrimination metric generator in accordance with the preferred embodiment of the present invention.

FIG. 3 is a block diagram of the sub-rate discrimination metric generator. The data converter 200 receives a deinterleaved data frame from the deinterleaver 102. The data converter 200 converts the soft decision symbols of the received data frame to binary hard decision symbols. FIG. 3 shows 2 analysis paths corresponding to the two possible sub-rate frames, eighth and half rate. Note that some speech compression algorithms and data service modes support a quarter rate frame. It will be apparent to those of ordinary skill in the art that the method as described is extensible to quarter rate frames and other frame rates as appropriate.

The eighth rate analysis path consists of an eighth rate segmentizer 202 and an eighth rate bin accumulator/comparator 204. The segmentizer 202 segments the data stream into 8 bit bins. The bin boundaries align with the data repetition boundaries that would have been introduced by the data repeater 44, if the original frame rate was eighth rate. The accumulator/comparator 204 determines whether the received frame has a high probability of being an eighth rate frame. The basic steps of the determination involve determining the number of bins, BIN_ACC_Eighth, within which the number of bits having the same polarity exceeds a threshold. If the number of bins exceeds another threshold then the probability of the frame being an eighth rate frame is high. An indication, Eighth_Rate_Flag, of such is passed to the MUX 220. To increase the accuracy of the determination some bit positions, such as those known to contain power control information bits, can be excluded from the accumulation and the thresholds adjusted accordingly. The bit positions of the power control information bits are provided to the accumulator/comparator 204 by the power control algorithm 210. Further details of the determination will be presented during discussion of flow diagram FIG. 4.

Returning to FIG. 3. The half rate analysis path consists of a half rate segmentizer 212 and a half rate bin accumulator/comparator 214. The segmentizer 212 segments the data stream into 2 bit bins, the bins boundaries being aligned with the data repetition boundaries that would have been introduced by the data repeater 44 of FIG. 1, if the original frame rate was half rate. The accumulator/comparator 214 determines whether the received frame has a high probability of being a half rate frame. An indication, Half_Rate_Flag, of the determination is passed to the MUX 220.

The MUX 220 receives the sub-rate determination flags Eighth_Rate_Flag and Half_Rate_Flag, and uses them to set a Sub-rate Corr Result. Note that due to the nature of the data repetition procedure, if the Eighth_Rate_Flag is TRUE then there is a high probability that the Half_Rate_Flag will also be TRUE. Thus the following rules for Sub-rate_Corr_Result are used:

Sub-rate_Corr_Result=NULL
   IF Eighth_Rate_Flag==TRUE
     Sub-rate_Corr_Result=EIGHTH
   IF Half_Rate_Flag==TRUE && Eighth_Rate_Flag== FALSE
     Sub-rate_Corr_Result=HALF Thus, if Sub-rate_Corr_Result is NULL, the Sub-rate Discrimination Metric Generator 160 reports to the determiner 150 that no significant correlation of the frame to the known sub-rate transmission characteristics could be found. If a significant correlation is found then Sub-rate_Corr_Result reports the most likely frame rate used by the transmitter.

In this preferred embodiment the MUX 220 reports a hard indication of the result. However, in an alternate embodiment the MUX 220 receives intermediate information such as BIN_ACC_Eighth and the corresponding half rate metric BIN_ACC_Half. These metrics are then passed to the determiner 150 to be directly incorporated in the rate determination algorithm with the CRC results and SERs.

Another alternative embodiment is for the segmentizers 202/212 and the accumulator/comparators 204/214 to directly use the soft decision symbols from the deinterleaver 102. For example, assume the following 4 bit soft decision scheme, where Conf_Level is a confidence level that a received bit was originally transmitted as a '1'.

| Soft Decision Value | Conf Level |
|---|---|
| 1111 | +1.0 |
| ... | ... |
| 1000 | +0.125 |
| 0111 | −0.125 |
| ... | ... |
| 0000 | −1.0 |
| Power Control bit | 0.0 |

For each bin, a metric, Soft_Bin_Metric is calculated that reflects the confidence that all the bits in the bin were originally transmitted with the same polarity. For example $$\text{Soft\_Bin\_Metric} = \text{abs}\left(\sum_{i=0}^{M-1} \text{Conf\_Level}(i)\right)$$

Where M is the bin size, which for eighth rate would be 8. BIN_ACC_Eighth would then be calculated as the number of bins within which Soft_Bin_Metric exceeded a threshold.

Figure 4:
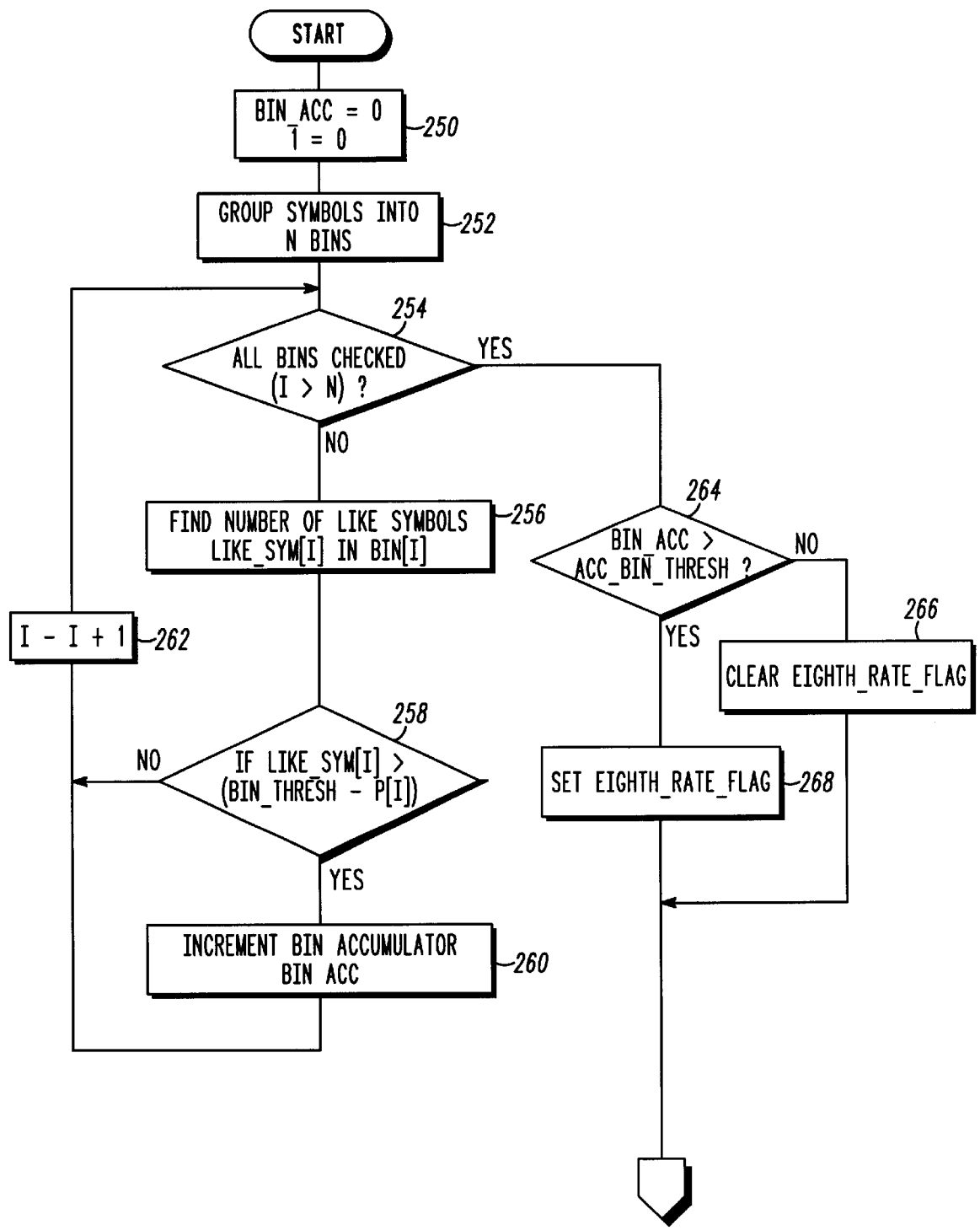
FIG. 4 is a flow chart showing operation of the sub-rate discriminator metric generator in accordance with the preferred embodiment of the present invention.

FIG. 4 is a flow diagram that shows more detail of the operation of the Sub-Rate Metric Generator 160. Only one decision leg of the generator 160 is explained, although it will be apparent to one ordinarily skilled in the art that the explanation is extensible to multiple legs. We start at step 250 by initializing variables used in the decision process including the number of bins exceeding the polarity check threshold BIN_ACC and a loop counter, I. At step 252 the eighth rate segmentizer 202 segments the data stream into N bins of M consecutive bits. For eighth rate N is 48 and M is 8. For half rate N is 192 and M is 2. The segmentized data is presented to the eighth rate bin accumulator/comparator 204 where each bin is analyzed.

At step 254 a determination is made whether all bins have been checked by comparing the loop counter to the total number of bins, N. If all bins have been checked the logic flow proceeds to step 264, else the flow proceeds to step 256. At step 256, the number of symbols with the predominant polarity, LIKE_SYM[I], is determined in the current bin, bin[I]. Any symbols occupying bit positions determined by the power control algorithm 210 to contain power control information bits are excluded from the LIKE_SYM[I] count. The logic flow continues to step 258, where LIKE_SYM[I] is compared to a threshold. The threshold consists of a rate dependent threshold, BIN_THRESH, and an offset P[I] determined by the number of power control information bits that the bin[I] was known to have contained. In the preferred embodiment, BIN_THRESH is set to 7 for the eighth rate decision path and 2 for the half rate decision path. Returning to step 258, if LIKE_SYM[I] does not exceed BIN_THRESH-P[I] then bin[I] is determined to have not shown the transmission characteristics of an eighth rate frame and the logic flow continues to step 262. Otherwise the logic flow continues to step 260 where the variable BIN_ACC is incremented. The logic flow continues to step 262 where the loop counter, I, is incremented before proceeding back to step 254.

Returning to step 254. If all N bins have been checked, then the logic flow continues to decision step 264. At step 264, the number of bins showing eighth rate transmission characteristics, BIN_ACC, is compared with a rate dependent threshold, ACC_BIN_THRESH. In the preferred embodiment ACC_BIN_THRES is substantially equal to 25 for the eighth rate decision path and substantially equal to 120 for the half rate decision path. If BIN_ACC exceeds ACC_BIN_THRESH then it has been determined that the whole frame showed a significant amount of eighth rate transmission characteristics. If BIN_ACC exceeds ACC_BIN_THRESH the logic flow ends at step 266 where the Eighth_Rate_Flag is set to TRUE, else the logic flow ends at step 268 where the Eighth_Rate_Flag is cleared to FALSE. As previously discussed this flag is used with the Half_Rate_Flag to determine the state of the Sub-rate_Corr_Result.

Figure 5:
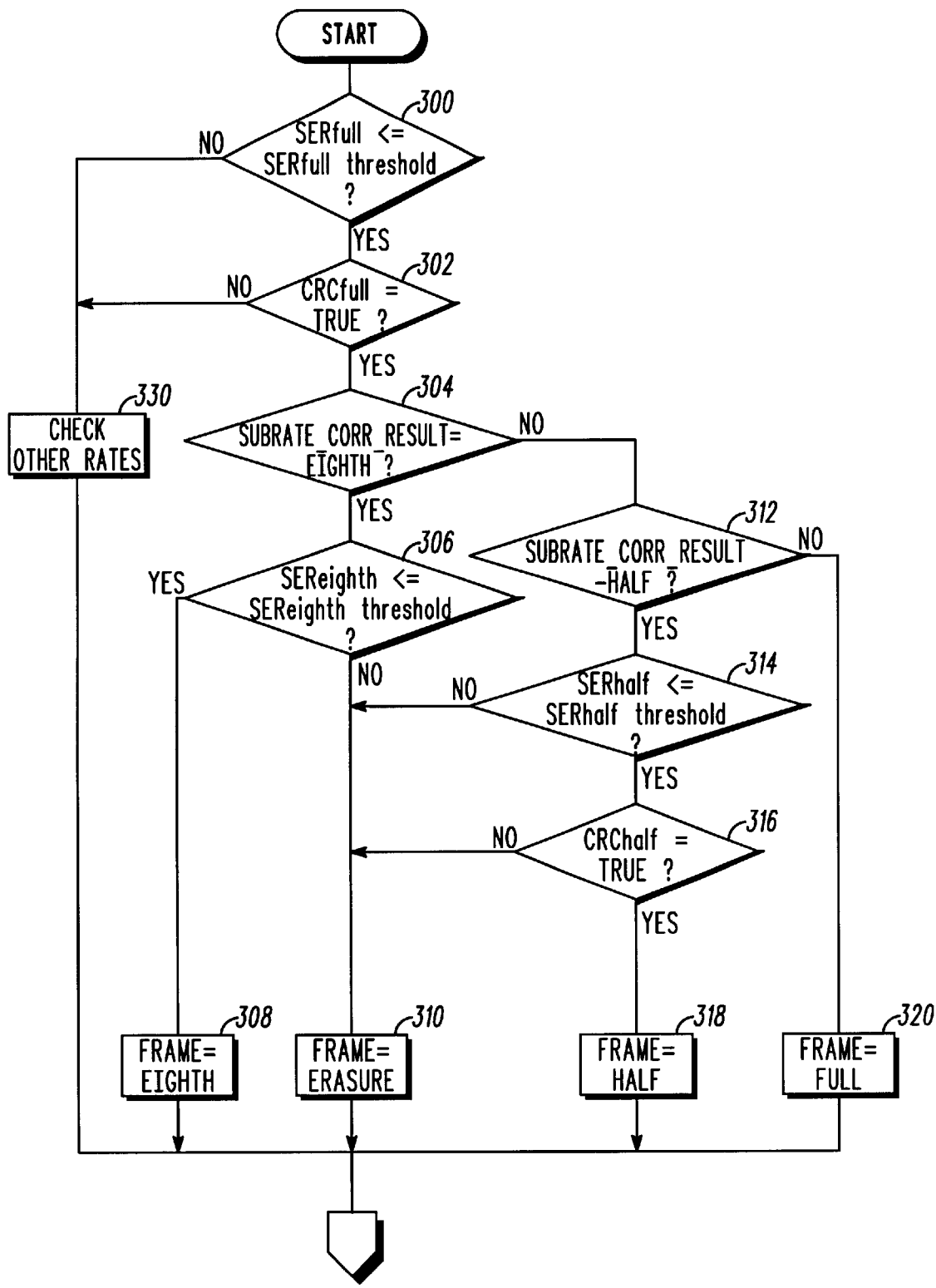
FIG. 5 is a flow chart showing operation of the rate determination algorithm utilizing the sub-rate discrimination metric in accordance with the preferred embodiment of the present invention.

FIG. 5 is a flow chart showing operation of a portion of the determiner 150. The logic flow begins at step 300 where $SER_{full}$, received from the convolutional decoder 120, is compared to a threshold $SER_{fullthreshold}$. If $SER_{full}$ exceeds or is equal to $SER_{fullthreshold}$ it implies that there is significant coding distance between the received frame and a valid full rate encoded signal, and thus is removed from being a possible full rate frame candidate. For this condition, the logic flow continues to step 330 where additional logic checks can be performed to determine whether the frame was a half rate or eighth rate frame. If $SER_{full}$ is less than $SER_{fullthreshold}$ then the logic flow continues to step 302 where the $CRC_{full}$, received from the CRC full rate CRC check 122, is checked. If $CRC_{full}$ is FALSE then the logic flow proceeds to checking for other frame rates at step 330. If $CRC_{full}$ is TRUE, then two conditions known in the art for declaring a full rate frame have been made. However, as has been previously discussed it has been observed that meeting these conditions alone can still cause an unacceptable level of falsing. Hence, the invention introduces additional steps in the rate determination process.

Returning to step 302. If $CRC_{full}$ is TRUE, then the logic flow continues to decision step 304 where Sub-rate_Corr_Result is compared to EIGHTH rate. If this condition is true the logic flow continues to step 306. At this step, significant doubt has been raised that the frame was originally transmitted as a full rate frame, and hence to minimize potential audio effects due to falsing a full rate determination is excluded. It now remains to determine whether additional indicators suggest that the frame was originally transmitted at eighth rate. One such indicator is to check whether $SER_{eighth}$, from convolutional decoder 106, exceeds $SER_{eighththreshold}$. If this condition is TRUE, then the frame is declared an eighth rate frame at step 308. Otherwise, there are too many conflicting pieces of information to reliably declare the rate of the frame and the logic flow continues to step 310 where the frame is declared an erasure.

Returning to step 304. If Sub-rate_Corr_Result does not equal EIGHTH the logic flow continues to decision step 312, where Sub-rate_Corr_result is further compared to HALF. If Sub-rate_Corr_Result does not equal HALF, then the frame is declared a full rate frame at step 320. Otherwise, the logic flow continues to step 314 where the SER_half from convolutional decoder 112 is compared to $SER_{halfthreshold}$. If SERhaif exceeds the threshold then again the frame rate cannot be reliably declared and thus the frame is declared an erasure at step 310. Otherwise, $CRC_{half}$, from the half rate CRC check 114, is checked at step 316. If $CRC_{half}$ is TRUE then the frame is declared half rate at step 318, else the frame is declared an erasure at step 310.

Figure 6:
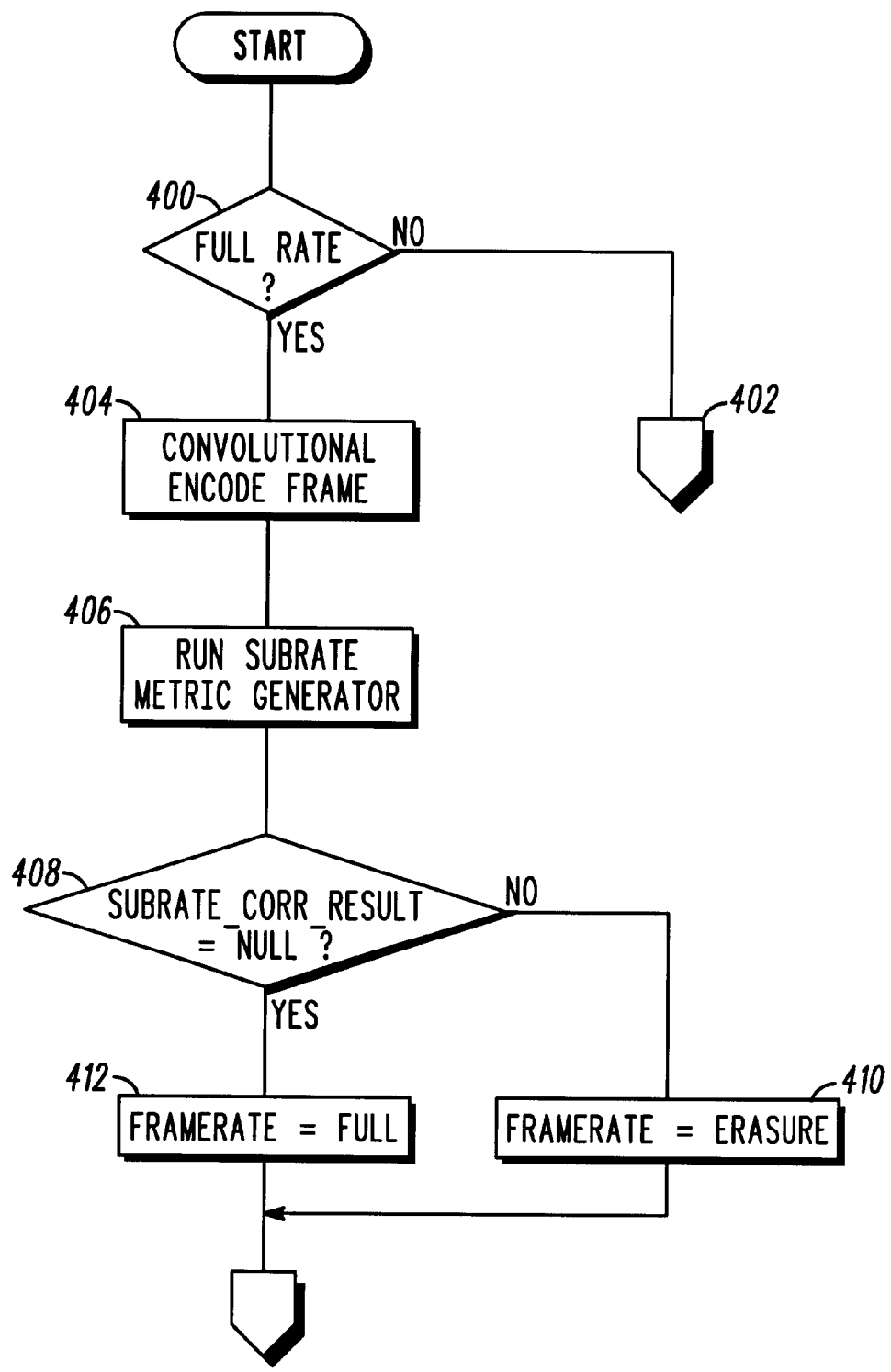
FIG. 6 is a flow chart showing operation of a Full Rate frame verification scheme in accordance with an alternate embodiment of the present invention.

Typically most of the functions shown in FIG. 2 are implemented in Application Specific ICs (ASICs). These functions include the deinterleaver 102, combiners, convolutional decoders and CRC checks. The determiner 150 is typically implemented in software. In the preferred embodiment described above the output of the deinterleaver 102 was provided to the metric generator 160. However, as that output is often only available to the internals of the ASIC, implementation of the preferred embodiment within existing mobile units could be difficult. FIG. 6 is a flow diagram of an alternate embodiment that may be more readily implementable in some applications. This alternate embodiment is presented as a full rate verification technique, although one ordinarily skilled in the art would understand that the embodiment is extensible to a complete rate determination algorithm.

It begins with decision step 400 where rate determination criteria as known in the art are used to determine whether the received frame was probably a full rate frame. If the frame is determined to be a non-full rate frame the logic flow ends at step 402, else the logic flow continues to step 404. As has been discussed earlier, the RDAs known in the art are prone to falsing and eighth rate frames falsely determined to be full rate frames can cause serious audio artifacts. Hence a full rate verification scheme is used to ensure that the frame does not exhibit chararacteristics of a sub-rate frame. At step 404 the decoded full rate frame is reencoded, that is the data stream is passed through a convolutional encoder operationally similar to the convolutional encoder 42. The logic flow then continues to step 406 where the reencoded data is tested for sub-rate transmission characteristics by using the sub-rate metric generator 160. The resulting Sub-rate_Corr_Result is checked at step 408. If Sub-rate_Corr_Result equals EIGHTH or HALF then the confidence level that the frame was originally transmitted at full rate is significantly reduced and hence the frame is declared an erasure at step 410. If Sub-rate_Corr_Result equals NULL then the frame did not exhibit sub-rate transmission characteristics and hence the frame is declared a full rate frame at step 412.

The invention has been described in terms of several preferred embodiments. These preferred embodiments are meant to be illustrative of the invention, and not limiting of its broad scope, which is set forth in the following claims.

What is claimed is:

1. A method for determining a frame rate from a set of possible frame rates for a frame received in a communication system, the method comprising the steps of:

receiving the frame;

segmenting the frame into a set of segments;

determining a confidence level that symbols within a segment of the set of segments were originally transmitted with the same polarity;

comparing the confidence level with a threshold; and determining the frame rate for the frame based on the comparison.

2. The method of claim 1, wherein the step of determining the frame rate comprises the step of determining a frame rate from a set of possible frame rates, wherein the set of possible frame rates consists of full rate, half rate and eighth rate.

3. The method of claim 1, wherein the step of segmenting the frame into the set of segments comprises the step of segmenting the frame into the set of segments wherein a size of a segment within the set is based on the frame rate.

4. The method of claim 3, wherein the frame rate is eighth rate and the segment size is 8.

5. The method of claim 3, wherein the first frame rate is half rate and the segment size is 2.

6. The method of claim 1, wherein a number of segments in the a set of segments is dependent, at least in part, on a a frame rate from a set of possible frame rates.

7. The method of claim 6, wherein the a frame rate is eighth rate and the number of segments is 48.

8. The method of claim 6, wherein the a frame rate is half rate and the number of segments is 192.

9. The method of claim 1, wherein the a confidence level is determined by accumulating a number of received valid symbols with a same polarity.

10. The method of claim 9, wherein received symbols known to be power control information symbols are deemed invalid symbols.

11. The method of claim 3, wherein the threshold is dependent on a number of power control information symbols in the segment.

12. The method of claim 11, wherein the frame rate is eighth rate and the threshold is 7 minus the number of power control information symbols in the first segment.

13. The method of claim 11, wherein the frame rate is half rate and the threshold is 2 minus the number of power control information symbols in the first segment.

14. The method of claim 1, wherein the threshold is dependent on a size of the segment.

15. A method for determining a frame rate from a set of possible frame rates for a frame in a communication system, the method comprising the steps of:

receiving a frame;

segmenting the frame into a first set of segments, each segment containing 8 symbols;

segmenting the frame into a second set of segments, each segment containing 2 symbols;

determining a first confidence level that the frame was originally transmitted as an eighth rate frame; and determining a second confidence level that the frame was originally transmitted as a half rate frame.

16. An apparatus for determining a frame rate of a frame within a communication system, the apparatus comprising:

a rate determiner having an input comprising a sub-rate correlation result, the sub-rate correlation result determined based on segmenting the frame into a set of segments and determining a confidence level that symbols within a segment of the set of segments were originally transmitted with the same polarity, the rate determiner outputting a frame rate based on the sub-rate correlation result.

* * * * *